(12) United States Patent
Tillotson et al.

(10) Patent No.: US 6,975,957 B2
(45) Date of Patent: Dec. 13, 2005

(54) DYNAMIC RUNTIME MODIFICATION OF SCPI GRAMMAR

(75) Inventors: Timothy Nephi Tillotson, Heber, UT (US); Sara Ting, Cupertino, CA (US); Nathan A. Berg, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/824,971

(22) Filed: Apr. 15, 2004

(65) Prior Publication Data

US 2005/0234675 A1  Oct. 20, 2005

(51) Int. Cl.[7] .............................................. G06F 19/00
(52) U.S. Cl. ...................... 702/123; 702/121; 702/122
(58) Field of Search ............................... 702/108, 121, 702/122, 123; 710/107, 119, 120, 243; 713/153, 713/157; 711/117, 145

(56) References Cited

U.S. PATENT DOCUMENTS

| | | | |
|---|---|---|---|
| 2002/0010714 A1 * | 1/2002 | Hetherington | 707/505 |
| 2004/0009813 A1 * | 1/2004 | Wind | 463/30 |

OTHER PUBLICATIONS

U.S. Appl. No. 10/825,465, filed Apr. 15, 2004, Timothy Nephi Tillotson et al.
U.S. Appl. No. 10/824,973, filed Apr. 15, 2004, Timothy Nephi Tillotson et al.
U.S. Appl. No. 10/825,466, filed Apr. 15, 2004, Timothy Nephi Tillotson et al.
U.S. Appl. No. 10/824,683, filed Apr. 15, 2004, Timothy Nephi Tillotson et al.

* cited by examiner

Primary Examiner—Bryan Bui (57) ABSTRACT

Alteration of a Standard Commands for Programmable Instrumentation (SCPI) command set for instrument control. In representative embodiments, each command of the command set includes a different combination of SCPI grammatical elements; the SCPI grammatical elements are organized hierarchically in a tree data structure; and the tree has nodes with each node comprising one of the SCPI grammatical elements. A node to alter is selected, and an alteration to the selected node is specified. Access to the selected node, as well as to any descendant nodes of the selected node is restricted; the selected node is altered in accordance with the specified alteration, wherein the alteration of the selected node is performed at runtime; and the access restriction to the selected node and to any descendant nodes of the selected node is removed, wherein the access restriction, node alteration, and access removal are performed while the instrument is operational.

16 Claims, 7 Drawing Sheets

DYNAMIC RUNTIME MODIFICATION OF SCPI GRAMMAR

BACKGROUND

Initially, electronic instruments were stand-alone units designed for rather limited and specific applications. Within the instrument industry, a wide variety of instrument command sets were developed which required instrument users to learn a new vocabulary for each instrument. This proliferation of command sets resulted in users spending a great deal of time learning how to program instruments, made maintenance of test programs difficult, and made it difficult to upgrade test systems as new equipment became available. In order to reduce development costs, various standard electrical and mechanical interfaces were developed for instruments and other electronic devices. With the advent of computer communication with and computer control of instruments and systems of instruments, standardized signal protocols and other standardized electrical and mechanical interfaces became more prevalent. These protocols were mainly intended to set standards for digital messages sent over these interfaces.

The Standard Commands for Programmable Instrumentation (SCPI) protocol standard was developed to define a set of commands for controlling programmable test and measurement devices in instrumentation systems. An instrumentation system is a collection of test and measurement devices connected by a communication bus to a control computer called the system controller. An instrumentation system may include stand-alone devices like IEEE 488 instruments or instrument cards in an enclosure such as a VXIbus rack.

Client processes often located on remote computers address commands, which may be, for example, a command to apply a signal, make a measurement, perform a calibration, or the like to one or more instruments over the bus. These commands are called program messages. Instruments may also send response messages back to the clients. The response messages may be measurement results, instrument settings, error messages, or the like. Prior to the SCPI standard, the commands that controlled a particular device function varied between instruments which had similar capabilities. SCPI provided a uniform and consistent language for the control of test and measurement instruments. The same commands and responses can control corresponding instrument functions in SCPI equipment, regardless of the supplier or the type of instrument.

For instance, the command to measure a frequency is the same whether the measurement is made by an oscilloscope or a counter. The set of commands to control multimeters from two manufacturers differs only in places where the underlying hardware has different capabilities. Thus, instruments from different vendors can be expected to be essentially interchangeable in many applications.

SCPI provides a means to perform simple operations. The MEAS (measure) command, for example, can configure and read data from an instrument. When the program message ":MEAS:VOLT:AC?" is received by a voltmeter, for example, the meter will select settings and configure its circuitry for an AC voltage measurement, initiate the measurement, and return the result to the system controller. The question mark at the end of the command instructs the voltmeter to return the measured value to the controller. As another example, the SCPI command ":MEAS:FREQ?" returns a frequency measurement from an oscilloscope or a counter, despite great internal differences in the hardware of the instruments.

SCPI commands are organized in hierarchical structures referred to as trees. In the above two commands, "MEAS" is a parent node in a SCPI tree while "VOLT" is one child node of that parent and "FREQ" is another child node.

A central feature of the SCPI standard is the Command Reference which is a list of definitions for all the program messages. These definitions specify precisely the syntax and semantics for every SCPI message. Instrument functions covered by the standard may only be controlled through SCPI commands. However, SCPI was designed with a modular structure that permits commands controlling new functions to be added at any time.

The Hewlett-Packard Interface Bus (HPIB) interface system, also known as the General-Purpose Interface Bus (GPIB) or by its Institute of Electrical and Electronic Engineers (IEEE) specification number IEEE 488, is a scheme by which groups of devices may be connected to a controlling computer and communicate under its direction. Instruments from multiple vendors can be operated in the same HPIB system. SCPI commands can be implemented on an instrument using any sort of interface, as for example, HPIB, serial/RS-232, VXI backplane, or the like, but they are especially common on HPIB busses.

The IEEE 488.1 standard defines hardware for an instrumentation bus. It is a digital bus with lines for the serial transfer of data bytes, plus extra control and handshaking lines. The IEEE 488.2 is an additional standard that defines protocols for data/command exchange between controller and instruments, basic data formats, systematic rules for program messages, and definition of instrument status structures. IEEE 488.2 also defines some common commands covering instrument functions that are universally applicable. However, IEEE 488.2 does not define commands or data structures for specific applications. Instrument makers are free to define the commands that control the primary functions of their instruments. SCPI builds upon IEEE 488.2 by standardizing these primary functions.

SUMMARY

In a representative embodiment, a method for the alteration of a Standard Commands for Programmable Instrumentation (SCPI) command set for instrument control is disclosed. Each command of the command set includes a different combination of SCPI grammatical elements; the SCPI grammatical elements are organized hierarchically in a tree data structure; and the tree has nodes with each node comprising one of the SCPI grammatical elements. A node to alter is selected, and an alteration to the selected node is specified. Access to the selected node, as well as to any descendant nodes of the selected node is restricted; the selected node is altered in accordance with the specified alteration, wherein the alteration of the selected node is performed at runtime; and the access restriction to the selected node and to any descendant nodes of the selected node is removed, wherein the access restriction, node alteration, and access removal are performed while the instrument is operational.

In another representative embodiment, a system for altering a Standard Commands for Programmable Instrumentation (SCPI) command set for instrument control is disclosed. The system comprises a grammar logic module. Each command of the command set comprises a different combination of SCPI grammatical elements; the SCPI grammatical elements are organized hierarchically in a tree data structure; and the tree has nodes with each node comprising one of the SCPI grammatical elements. When a node is selected for alteration and an alteration to the selected node is specified, the grammar logic module has capability of restricting access to the selected node and to any descendant nodes of the selected node, altering the selected node in accordance with the specified alteration, wherein the step altering the selected node is performed at runtime, and removing access restriction to the selected node and to any descendant nodes of the selected node. While access to the selected node is restricted, the instrument is operational.

Other aspects and advantages of the disclosed embodiments will become apparent from the following detailed description, taken in conjunction with the accompanying drawings, illustrating by way of example various principles of the invention.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

As shown in the drawings for purposes of illustration, the present patent document relates to a novel method for the dynamic runtime modification of Standard Commands for Programmable Instrumentation (SCPI) grammar in instruments and in systems of instruments. Previous methods for modifying the SCPI grammar of an instrument built upon a SCPI parse tree created at compile time. Additional changes to the SCPI grammar required runtime linking and loading of new SCPI grammars. This process included buffering all SCPI communication while the SCPI parser and some of the software in the instrument are restarted. This process is extremely time consuming, inflexible, and error prone. Many errors in instrument personalities, startup, and updates were related to this inflexibility. This runtime linking also required the entire parse tree to be represented in a single location, rather then distributed across several local or remote processes and/or applications.

Representative embodiments disclosed herein allow the SCPI grammar for a system, as for example, an instrument to be changed dynamically at runtime with very little impact on the execution of parsers and system applications. Further, this registration of new SCPI or GPIB grammars can be performed by either the parser or by other instrument applications. Quick in-memory swapping of portions of the SCPI grammar, rather than stopping the parser, linking and loading a new parse tree, and restarting the parser and other instrument applications is now possible. The dynamic registration of the SCPI grammar from other applications also allows for much easier post deployment of instrument applications or personalities, for greatly decreased development time, and for increased measurement presentation flexibility.

In the following detailed description and in the several figures of the drawings, like elements are identified with like reference numerals.

Figure 1A:
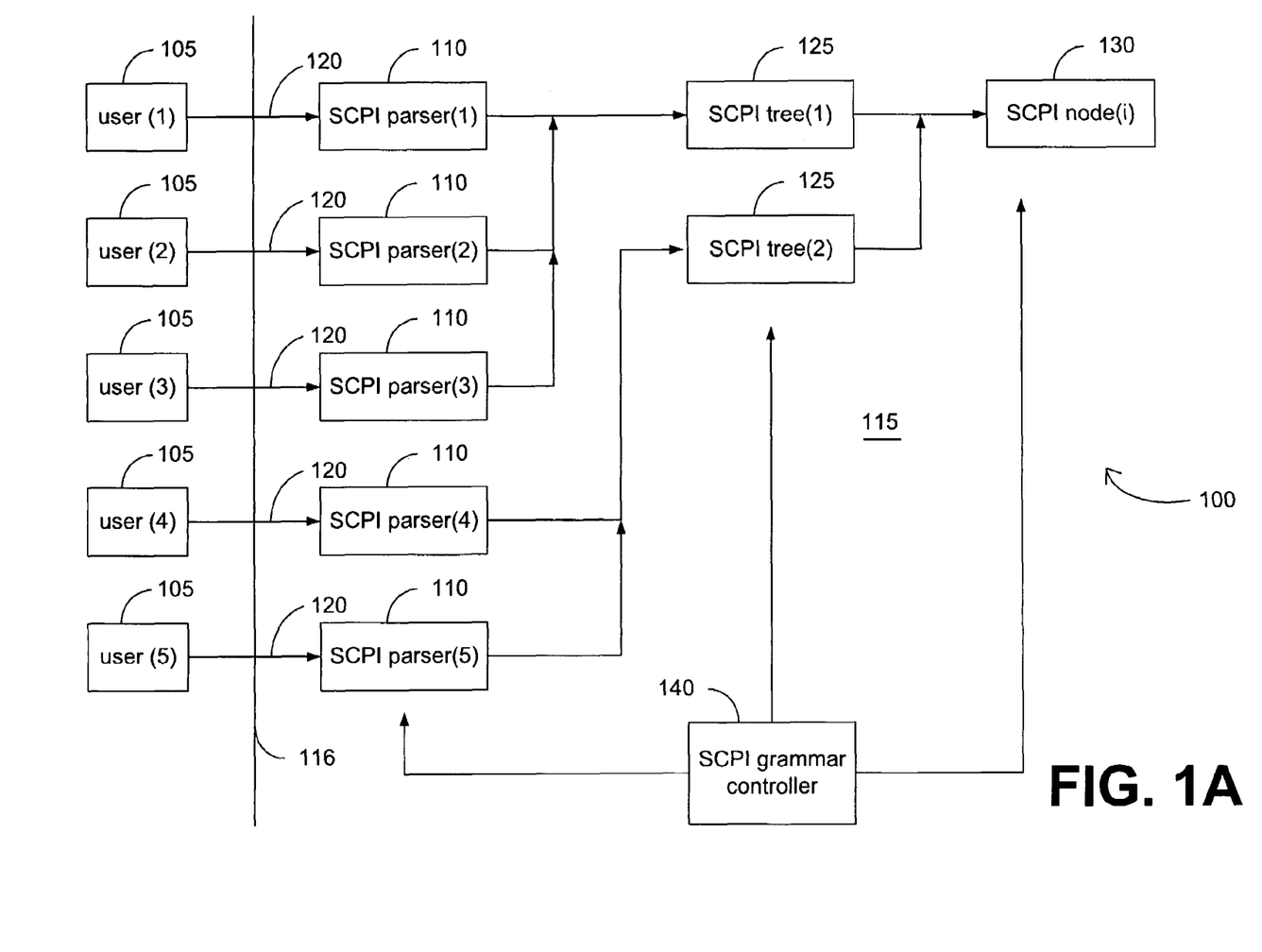
FIG. 1A is a block diagram of a SCPI grammar modification system as described in various representative embodiments.

FIG. 1A is a block diagram of a SCPI grammar modification system 100 as described in various representative embodiments. In the embodiment of FIG. 1A, clients 105, also referred to herein as users 105, external to an instrument 115 are shown to the left of instrument boundary 116. Blocks to the right of the instrument boundary 116 are a part of the instrument 115. As shown in FIG. 1A, each user 105 [user(1) 105, user(2) 105, user(3) 105, user(4) 105, and user(5) 105] communicates with a parser 110 [parser(1) 110, parser(2) 110, parser(3) 110, parser(4) 110, or parser(5) 110] associated with that user 105 via a communication link 120 which is typically a common bus 120. In particular in FIG. 1A, user(1) 105 communicates with parser(1) 110, user(2) 105 communicates with parser(2) 110, user(3) 105 communicates with parser(3) 110, user(4) 105 communicates with parser(4) 110, and user(5) 105 communicates with parser(5) 110. Several parsers 110 can communicate with the same SCPI tree 125 [SCPI tree(1) 125 and SCPI tree(2) 125], also referred to herein as tree 125. In the example of FIG. 1A, SCPI parser(1) 110, SCPI parser(2) 110, and SCPI parser(3) 110 communicate with SCPI tree(1) 125. Also, SCPI parser (4) 110 and SCPI parser(5) 110 communicate with SCPI tree(2) 125. In addition, several SCPI trees 125 can communicate with the same SCPI node 130 [SCPI node(I)], also referred to herein as node 130. In particular in the embodiment of FIG. 1A, SCPI tree(1) 125 and SCPI tree(2) 125 communicate with SCPI node(I) 130. For illustrative purposes, only one SCPI node 130 is shown in FIG. 1A.

In alternative embodiments, SCPI parsers 110 can be located on their respective, associated users 105 or other devices instead of on the instrument 115 as shown in FIG. 1A. In other alternative embodiments, SCPI trees 125 and associated SCPI parsers 110 can be located on their respective, associated users 105 or other devices instead of on the instrument 115 as shown in FIG. 1A. And in still other alternative embodiments, SCPI nodes 130, associated SCPI trees 125 and associated SCPI parsers 110 can be located on their respective, associated users 105 or other devices instead of on the instrument 115 as shown in FIG. 1A.

A SCPI tree 125 is a collection of SCPI nodes 130 of which only one SCPI node 130 is shown in FIG. 1A. Each SCPI node 130 typically defines a particular SCPI command or program message. In the embodiment of FIG. 1A, each client 105 communicates with its own SCPI parser 110 so that each client 105 can have its on unique view of the instrument 115. One particular client 105 may be a so-called legacy client 105 which is a client 105 that had instrument applications developed for it at an earlier time. Later modifications of the instrument 115 may provide capabilities that differ from those that the legacy client 105 is designed to control.

As indicated in the representative embodiment of FIG. 1A, multiple SCPI parsers 110 can share a given SCPI tree 125, and multiple SCPI trees 125 can share a given SCPI node 130. In alternative embodiments, multiple users 105 can share a given SCPI parser 110.

In the example of FIG. 1A, it may be that user(1) 105, user(2) 105, and user(3) 105 are legacy clients 105, whereas user(4) 105 and user(5) 105 are designed to control the newer applications. By having each user 105 associated with its own parser 110, the instrument 115 appears to be unchanged to user(1) 105, user(2) 105, and user(3) 105 even though the instrument 115 may have undergone several revisions. Various applications on the instrument 115 may have been added, modified, or deleted. Should user(1) 105, user(2) 105, and user(3) 105 require the same applications, they could all access the same SCPI tree 125 which in FIG. 1A is SCPI tree(1) 125. And should user(4) 105 and user(5) 105 require the same applications, they could all access the same SCPI tree 125 which in FIG. 1A is SCPI tree(2) 125.

The applications controlled by any given user 105 may be individually upgraded. A new SCPI tree 125 is created for any user 105 whose applications have been upgraded and whose SCPI tree 125 now differs from that of any other SCPI tree 125 on the instrument 115. Or, if the applications that are controlled, for example, by user(2) 105 are changed/modified/upgraded to be the same as those of user(4) 105 and user(5) 105, user(2) access of SCPI tree(1) 125 by user(2) 105 is terminated and instead user(2) 105 is now directed to SCPI tree(2) 125.

In a similar manner, the users 105 in FIG. 1A may use a command common to all of them. In such case, both SCPI tree(1) 125 and SCPI tree(2) 125 will both be capable of accessing the command of SCPI node(I) 130. In a manner similar to that above, if the command represented by SCPI node(I) 130 is updated for a particular set of users 105, the updated SCPI nodes 130 with that command revision will be removed from their previous SCPI trees 125 and attached to another SCPI tree 125 or a new SCPI tree 125.

In effect a particular SCPI tree 125 is associated with a particular configuration or application state of the instrument 115. These application states are referred to as dynamically loadable programs or personalities. As an example, if the instrument 115 performs a set of tests on a cell phone having different protocols, the difference in protocol is referred to as a difference in personality which is a difference in the view that a particular user 105 has of the instrument 115. For such a difference in cell phone protocol, the SCPI tree 125 will differ with that personality difference. Two users 105 may have a different view of the SCPI tree 125 based upon what personality or application the instrument 115 is in. Two clients 105 may have a SCPI tree 125 that is the same initially, but changes as various application conditions are changed.

As needed in any given implementation, SCPI nodes 130 can be added to the SCPI tree 125, deleted from the SCPI tree 125, modified, and/or moved to a new location on the SCPI tree 125. The addition, modification, and deletion of SCPI nodes 130 can be effected at runtime by temporarily blocking or restricting access to the affected SCPI nodes 130 from access by other than a SCPI grammar controller 140. The SCPI grammar controller 140 adds, modifies, and deletes SCPI nodes 130 as needed.

Figure 1B:
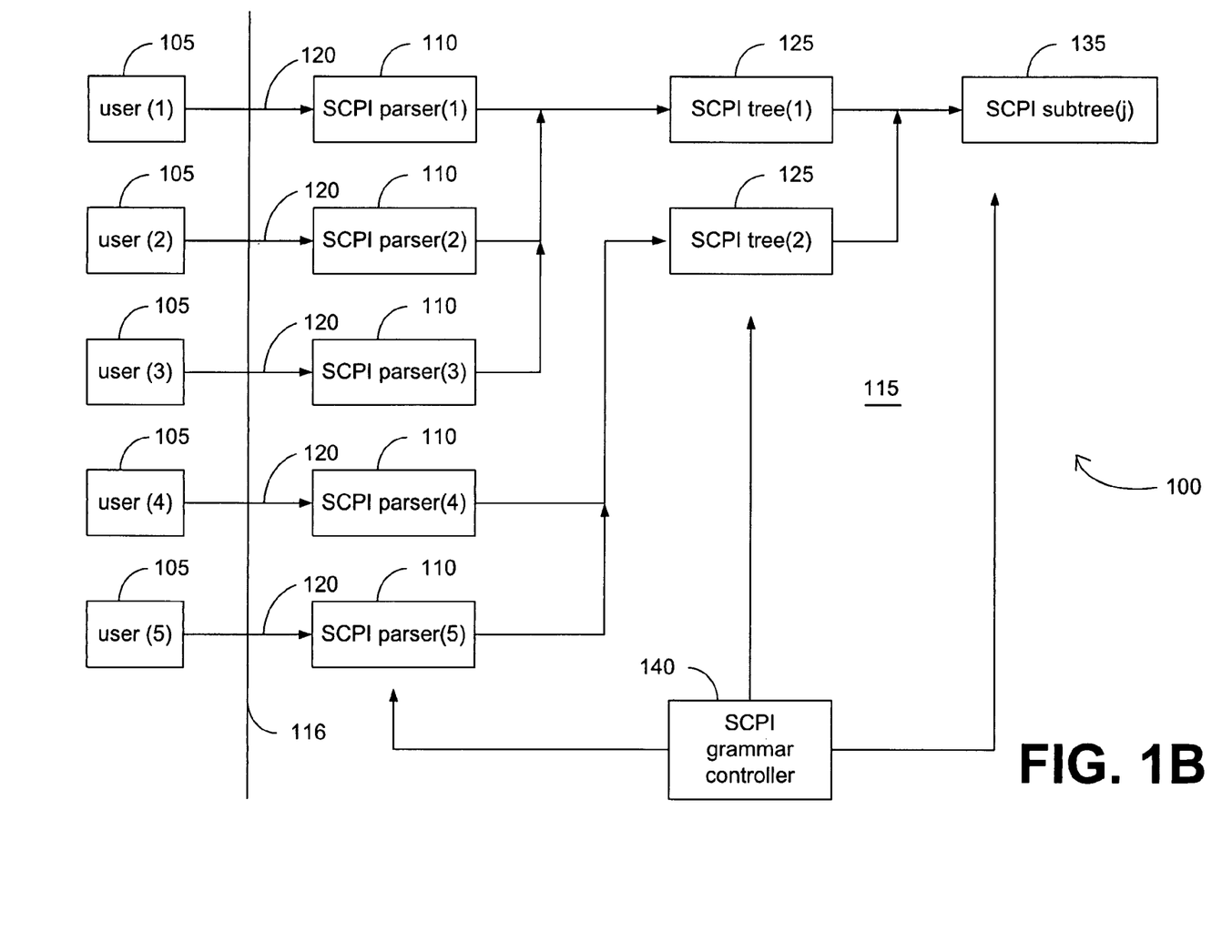
FIG. 1B is a block diagram of another SCPI grammar modification system as described in various representative embodiments.

FIG. 1B is a block diagram of another SCPI grammar modification system 100 as described in various representative embodiments. In the embodiment of FIG. 1B, clients 105 external to the instrument 115 are shown to the left of instrument boundary 116. Blocks to the right of the instrument boundary 116 are a part of the instrument 115. As shown in FIG. 1B, each user 105 [user(1) 105, user(2) 105, user(3) 105, user(4) 105, and user(5) 105] communicates with the parsers 110 [parser(1) 110, parser(2) 110, parser(3) 110, parser(4) 110, or parser(5) 110] associated with that user 105 via the communication link 120 which is typically a common bus 120. In particular in FIG. 1B, user(1) 105 communicates with parser(1) 110, user(2) 105 communicates with parser(2) 110, user(3) 105 communicates with parser(3) 110, user(4) 105 communicates with parser(4) 110, and user(5) 105 communicates with parser(5) 110. Several parsers 110 can communicate with the same SCPI tree 125 [SCPI tree(1) 125 and SCPI tree(2) 125]. In the example of FIG. 1B, SCPI parser(1) 110, SCPI parser(2) 110, and SCPI parser(3) 110 communicate with SCPI tree(1) 125. Also, SCPI parser(4) 110 and SCPI parser(5) 110 communicate with SCPI tree(2) 125. In addition, several SCPI trees 125 can communicate with the same SCPI subtree 135 [SCPI subtree(j)], also referred to herein as subtree 135. In particular in the embodiment of FIG. 1B, SCPI tree(1) 125 and SCPI tree(2) 125 communicate with SCPI subtree(j) 135. A SCPI subtree 135 is a collection of SCPI nodes 130 either attached to or intended for attachment to a SCPI tree 125. A SCPI subtree 135 includes a selected parent SCPI node 130, all child SCPI nodes 130 of the parent SCPI node 130, and all other descendant SCPI nodes 130 of the parent SCPI node 130. For illustrative purposes, only one SCPI subtree 135 is shown in FIG. 1B.

In alternative embodiments, SCPI parsers 110 can be located on their respective, associated users 105 or other devices instead of on the instrument 115 as shown in FIG. 1B. In other alternative embodiments, SCPI trees 125 and associated SCPI parsers 110 can be located on their respective, associated users 105 or other devices instead of on the instrument 115 as shown in FIG. 1B. And in still other alternative embodiments, SCPI subtrees 135, associated SCPI trees 125 and associated SCPI parsers 110 can be located on their respective, associated users 105 or other devices instead of on the instrument 115 as shown in FIG. 1B.

As needed in any given implementation, SCPI subtrees 135 can be added to the SCPI tree 125, deleted from the SCPI tree 125, modified, and/or moved to a new location on the SCPI tree 125.

As indicated in the representative embodiment of FIG. 1B, multiple SCPI parsers 110 can share a given SCPI tree 125, and multiple SCPI trees 125 can share a given SCPI subtree 135. In alternative embodiments, multiple users 105 can share a given SCPI parser 110.

Figure 2A:
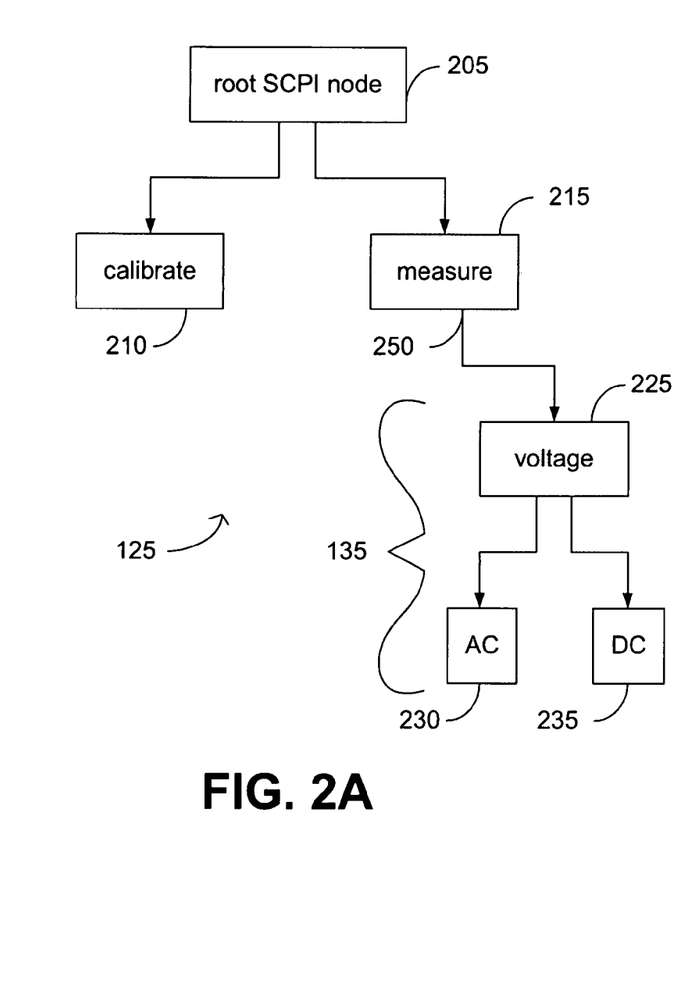
FIG. 2A is a block diagram of a SCPI tree as described in various representative embodiments.

FIG. 2A is a block diagram of a SCPI tree 125 as described in various representative embodiments. In the representative embodiment of FIG. 2A, the SCPI tree 125 comprises various SCPI nodes 130 indicated as root node 205, calibrate node 210, measure node 215, voltage node 225, AC node 230, and DC node 235. Also shown in FIG. 2A is SCPI subtree 135 which comprises voltage node 225 with child nodes AC node 230 and DC node 235. All SCPI nodes 130 on a SCPI tree 125 can be identified by their SCPI node location 250 only one of which is explicitly indicated in FIG. 2A for illustrative purposes. The SCPI node location 250 identifies where on a SCPI tree 125 a SCPI node 130 or SCPI subtree 135 is located while use of the term SCPI node 130 is used to indicate the functionality of that SCPI node 130.

Figure 2B:
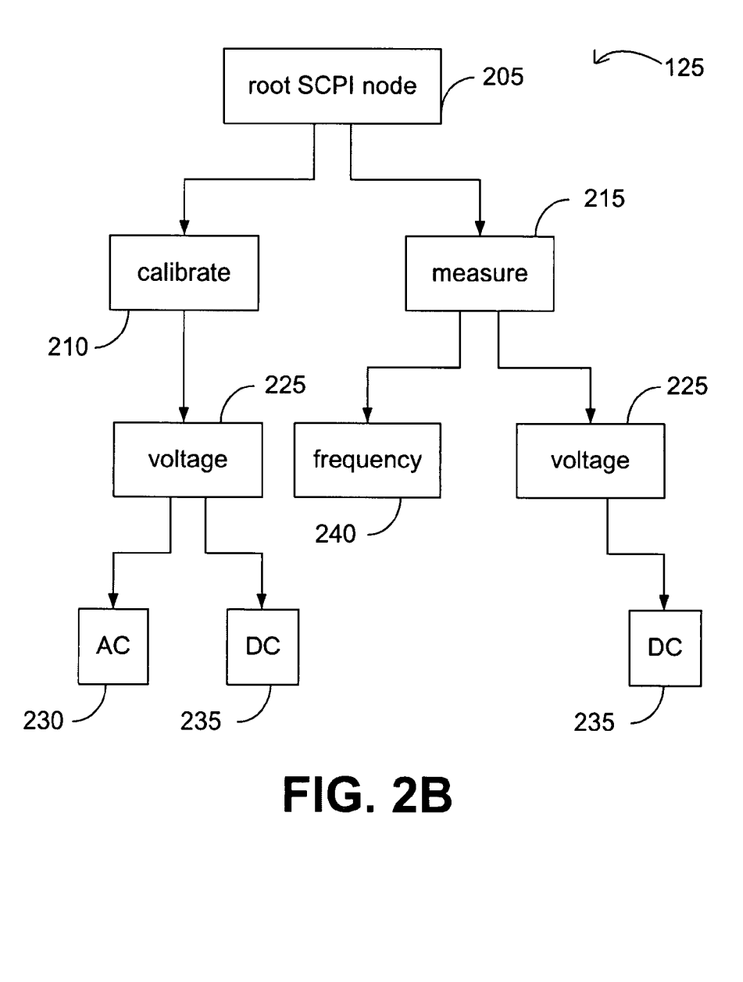
FIG. 2B is a block diagram of a modification of the SCPI tree of FIG. 2A.

FIG. 2B is a block diagram of a modification of the SCPI tree 125 of FIG. 2A. The SCPI subtree 135 in FIG. 2A whose sub-root node is voltage node 225 has been moved from attachment to the measure node 215 to attachment to the calibrate node 210 in FIG. 2B. Frequency node 240 has been added to the SCPI tree 125 with attachment to the measure node 215. Further, the AC node 230 in FIG. 2A has been deleted from the SCPI tree 125 as shown in FIG. 2B. The AC node 230 had been a child node 130 of voltage node 225.

Figure 3:
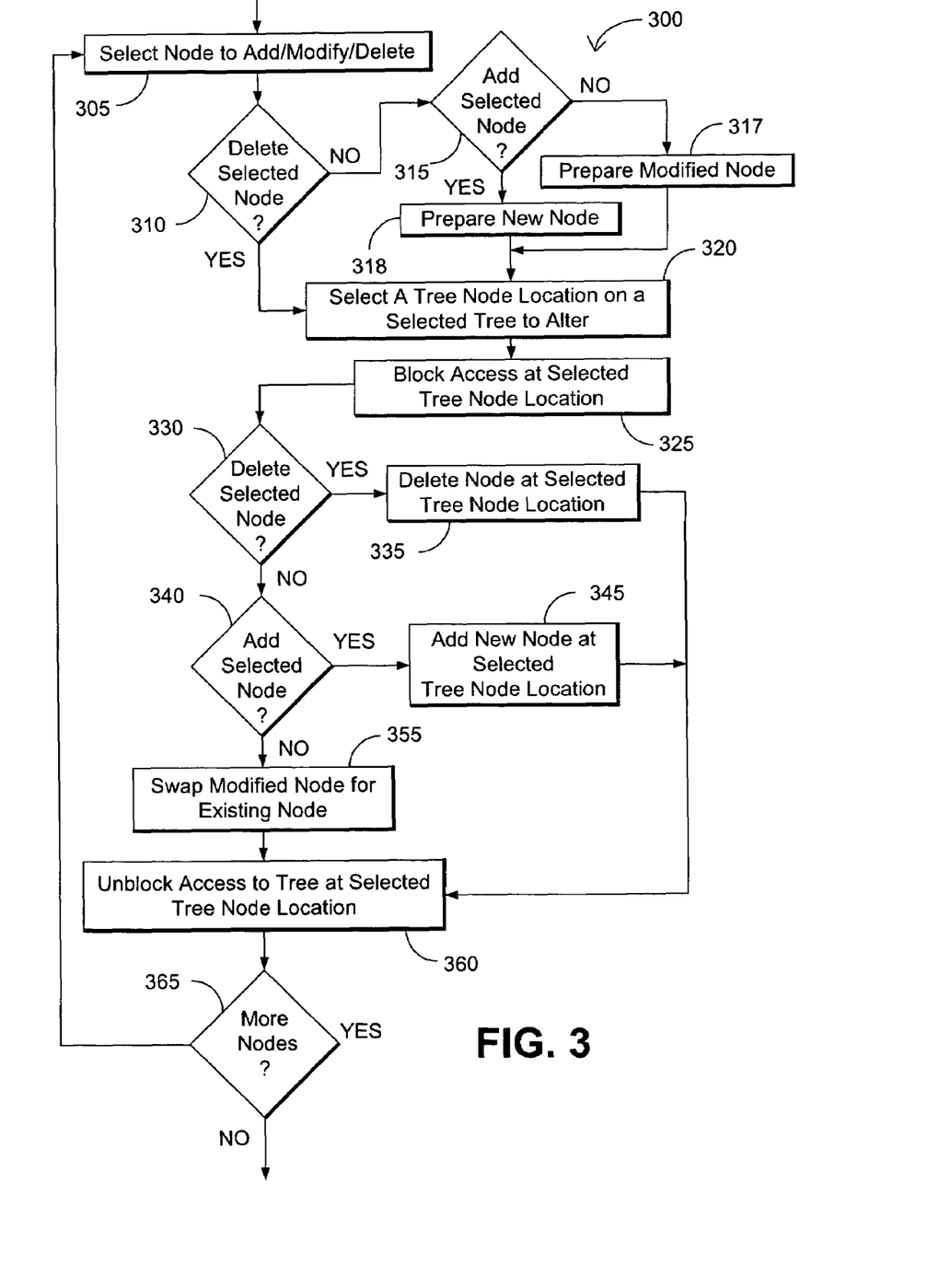
FIG. 3 is a flow chart of a method for the modification of SCPI nodes in SCPI trees as described in various representative embodiments.

FIG. 3 is a flow chart of a method 300 for the modification of SCPI nodes 130 in SCPI trees 125 as described in various representative embodiments. In block 305 of FIG. 3, a particular SCPI node 130 is selected to be added to, modified on, or deleted from a given SCPI tree 125. Block 305 then transfers control to block 310.

In block 310, when the selected SCPI node 130 is to be deleted, block 310 transfers control to block 320. Otherwise, block 310 transfers control to block 315.

In block 315, when the selected SCPI node 130 is to be added to the SCPI tree 125, block 315 transfers control to block 318. Otherwise, block 315 transfers control to block 317.

In block 317, a copy of the selected SCPI node 130 is modified. Block 317 then transfers control to bock 320.

In block 318, a new SCPI node 130 is prepared. Block 318 then transfers control to block 320.

In block 320, a SCPI node location 250 is selected for alteration. Such alteration can include adding a new SCPI node 130, modifying an existing SCPI node 130, or deleting an existing SCPI node 130. Block 320 then transfers control to block 325.

In block 325, access to the selected SCPI node location 250 is blocked or restricted for access by other than the SCPI grammar controller 140. Block 325 then transfers control to block 330.

In block 330, when the selected SCPI node 130 is to be deleted from the SCPI tree 125, block 330 transfers control to block 335. Otherwise, block 330 transfers control to block 340.

In block 335, the selected SCPI node 130 is deleted from the selected SCPI tree 125 at the selected SCPI node location 250 by the SCPI grammar controller 140. Block 335 then transfers control to block 360.

In block 340, when the selected SCPI node 130 is to be added to the SCPI tree 125, block 340 transfers control to block 345. Otherwise, block 340 transfers control to block 355.

In block 345, the selected SCPI node 130 is added to the selected SCPI tree 125 at the selected SCPI node location 250 by the SCPI grammar controller 140. Block 345 then transfers control to block 360.

In block 355, the existing SCPI node 130 is replaced with the modified SCPI node 130 in the selected SCPI tree 125 at the selected SCPI node location 250. Block 355 then transfers control to block 360.

In block 360, access to the selected SCPI node location 250 is unblocked (access restriction is removed). Block 360 then transfers control to block 365.

In block 365 when there is at least one additional SCPI node 130 to be added, modified, or deleted, block 365 transfers control to block 305. Otherwise, block 365 terminates the process.

Figure 4:
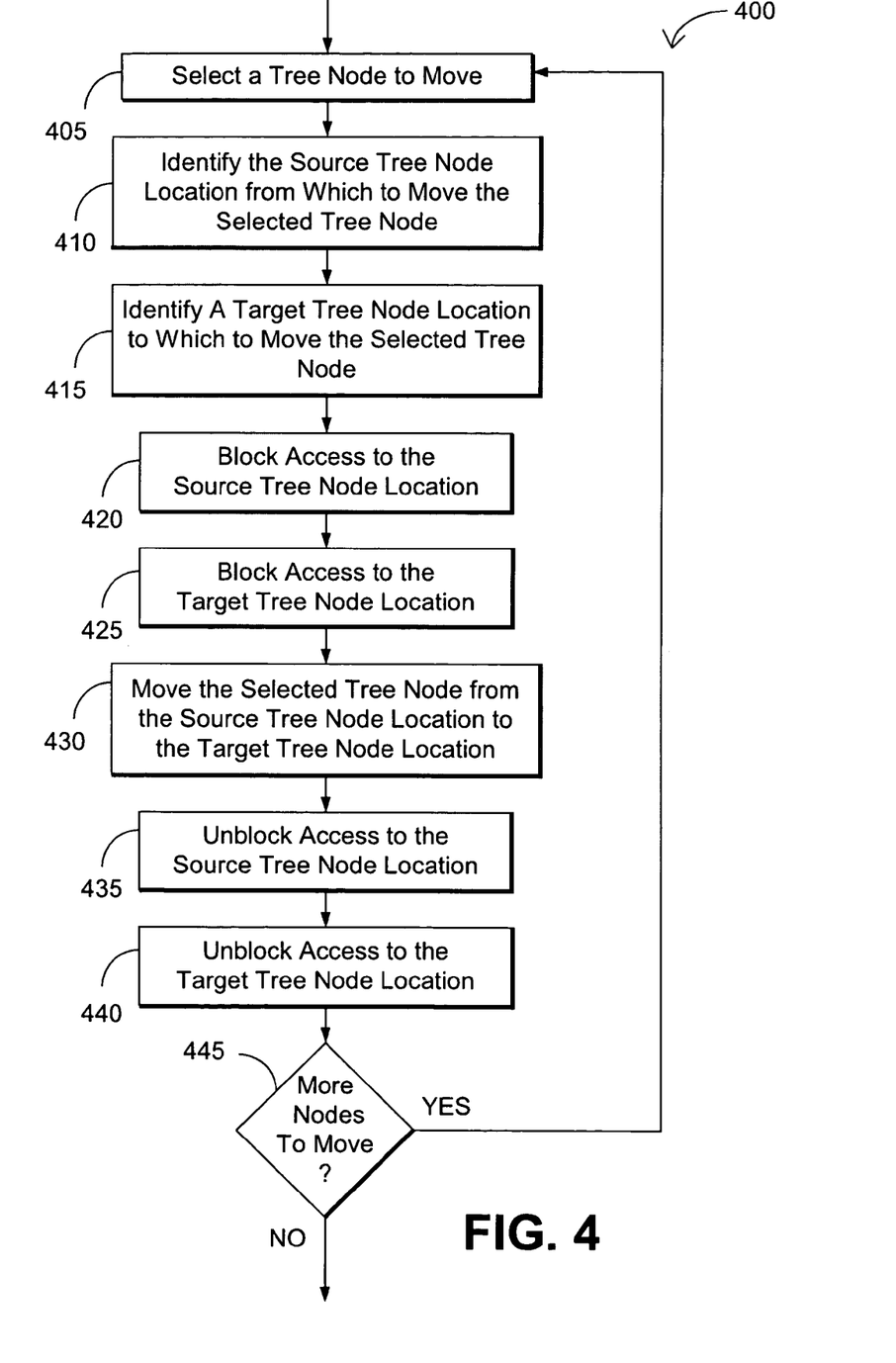
FIG. 4 is a flow chart of a method for the movement of SCPI nodes in SCPI trees as described in various representative embodiments.

FIG. 4 is a flow chart of a method 400 for the movement of SCPI nodes 130 in SCPI trees 125 as described in various representative embodiments. In block 405 of FIG. 4, a SCPI node 130 is selected for movement to another SCPI node location 250. Block 405 then transfers control to block 410.

In block 410, the source SCPI node location 250 from which the selected SCPI node 130 is to be moved to another SCPI node location 250 is identified. Block 410 then transfers control to block 415.

In block 415, the target SCPI node location 250 to which the selected SCPI node 130 is to be moved is identified. Block 415 then transfers control to block 420.

In block 420, access to the selected source SCPI node location 250 is blocked or restricted for access by other than the SCPI grammar controller 140. Block 420 then transfers control to block 425.

In block 425, access to the selected target SCPI node location 250 is blocked or restricted for access by other than the SCPI grammar controller 140. Block 425 then transfers control to block 430.

In block 430, the selected SCPI node 130 is moved from the source SCPI node location 250 to the target SCPI node location 250 by the SCPI grammar controller 140. Block 430 then transfers control to block 435.

In block 435, access to the source SCPI node location 250 is unblocked (access restriction is removed). Block 435 then transfers control to block 440.

In block 440, access to the target SCPI node location 250 is unblocked (access restriction is removed). Block 440 then transfers control to block 445.

In block 445, when the there are additional SCPI nodes 130 to be moved, block 445 transfers control to block 405. Otherwise, block 445 terminates the process.

Figure 5:
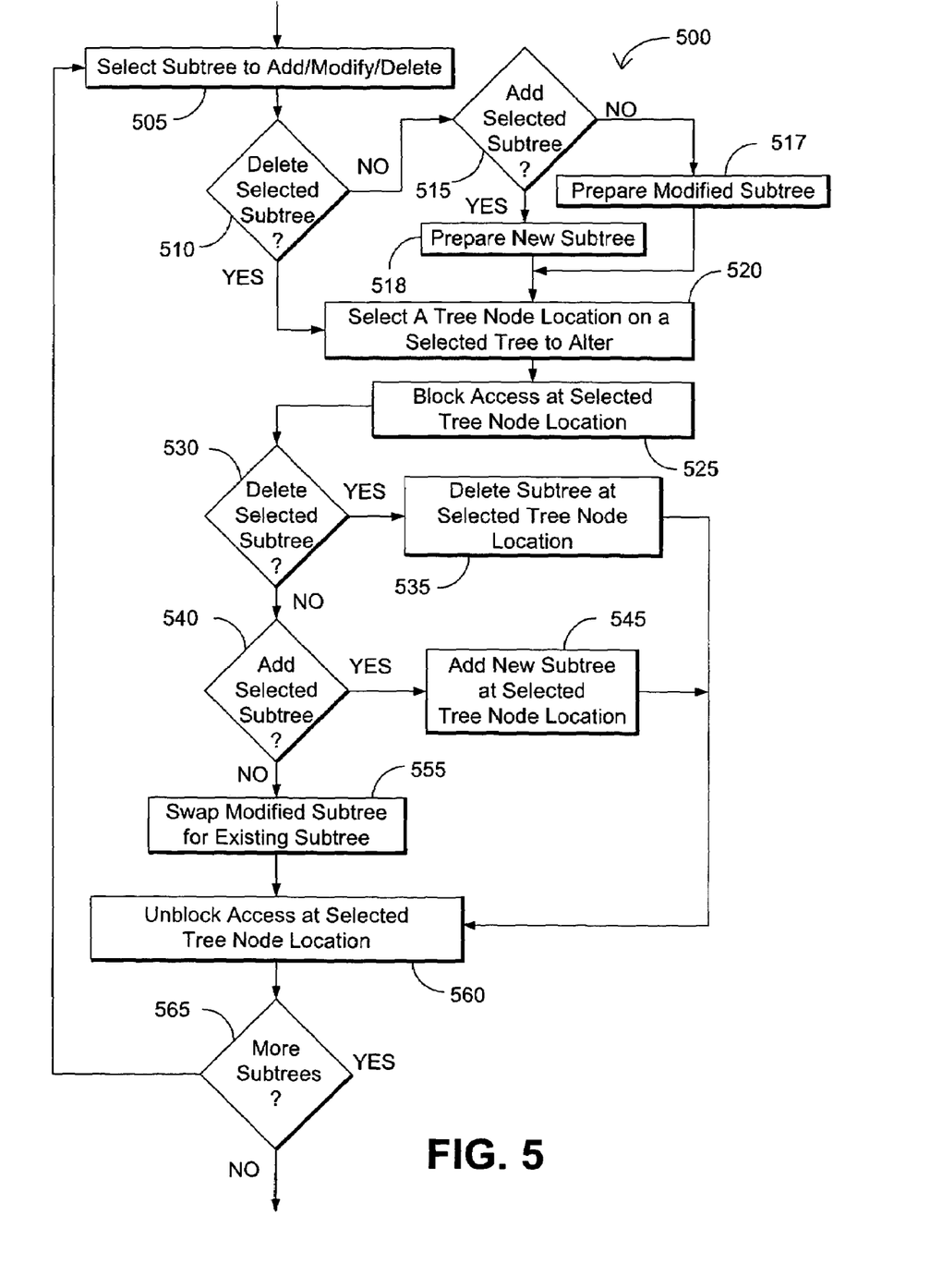
FIG. 5 is a flow chart of a method for the modification of SCPI subtrees in SCPI trees as described in various representative embodiments.

FIG. 5 is a flow chart of a method 500 for the modification of SCPI subtrees 135 in SCPI trees 125 as described in various representative embodiments. In block 505 of FIG. 5, a particular SCPI subtree 135 is selected to be added to, modified on, or deleted from a given SCPI tree 125. When the selected SCPI subtree 135 is to be deleted, block 510 transfers control to block 520. Otherwise, block 510 transfers control to block 515.

In block 515, when the selected SCPI subtree 135 is to be added to the SCPI tree 125, block 515 transfers control to block 518. Otherwise, block 515 transfers control to block 517.

In block 517, a copy of the selected SCPI subtree 135 is modified. Block 517 then transfers control to bock 520.

In block 518, a new SCPI subtree 135 is prepared. Block 518 then transfers control to block 520.

In block 520, a SCPI node location 250 is selected for alteration. Such alteration can include adding a new SCPI subtree 135, modifying an existing SCPI subtree 135, and/or deleting an existing SCPI subtree 135. Block 520 then transfers control to block 525.

In block 525, access to the selected SCPI node location 250 is blocked or restricted for access by other than the SCPI grammar controller 140. Block 525 then transfers control to block 530.

In block 530, when the selected SCPI subtree 135 is to be deleted from the SCPI tree 125, block 530 transfers control to block 535. Otherwise, block 530 transfers control to block 540.

In block 535, the selected SCPI subtree 135 is deleted from the selected SCPI tree 125 at the selected SCPI node location 250 by the SCPI grammar controller 140. Block 535 then transfers control to block 560.

In block 540, when the selected SCPI subtree 135 is to be added to the SCPI tree 125, block 540 transfers control to block 545. Otherwise, block 540 transfers control to block 555.

In block 545, the selected SCPI subtree 135 is added to the selected SCPI tree 125 at the selected SCPI node location 250 by the SCPI grammar controller 140. Block 545 then transfers control to block 560.

In block 555, the existing SCPI subtree 135 is replaced with the modified SCPI subtree 135 in the selected SCPI tree 125 at the selected SCPI node location 250. Block 555 then transfers control to block 560.

In block 560, access to the selected SCPI node location 250 is unblocked (access restriction is removed). Block 560 then transfers control to block 565.

In block 565 when there is at least one additional SCPI subtree 130 to be added, modified, or deleted, block 565 transfers control to block 505. Otherwise, block 565 terminates the process.

Figure 6:
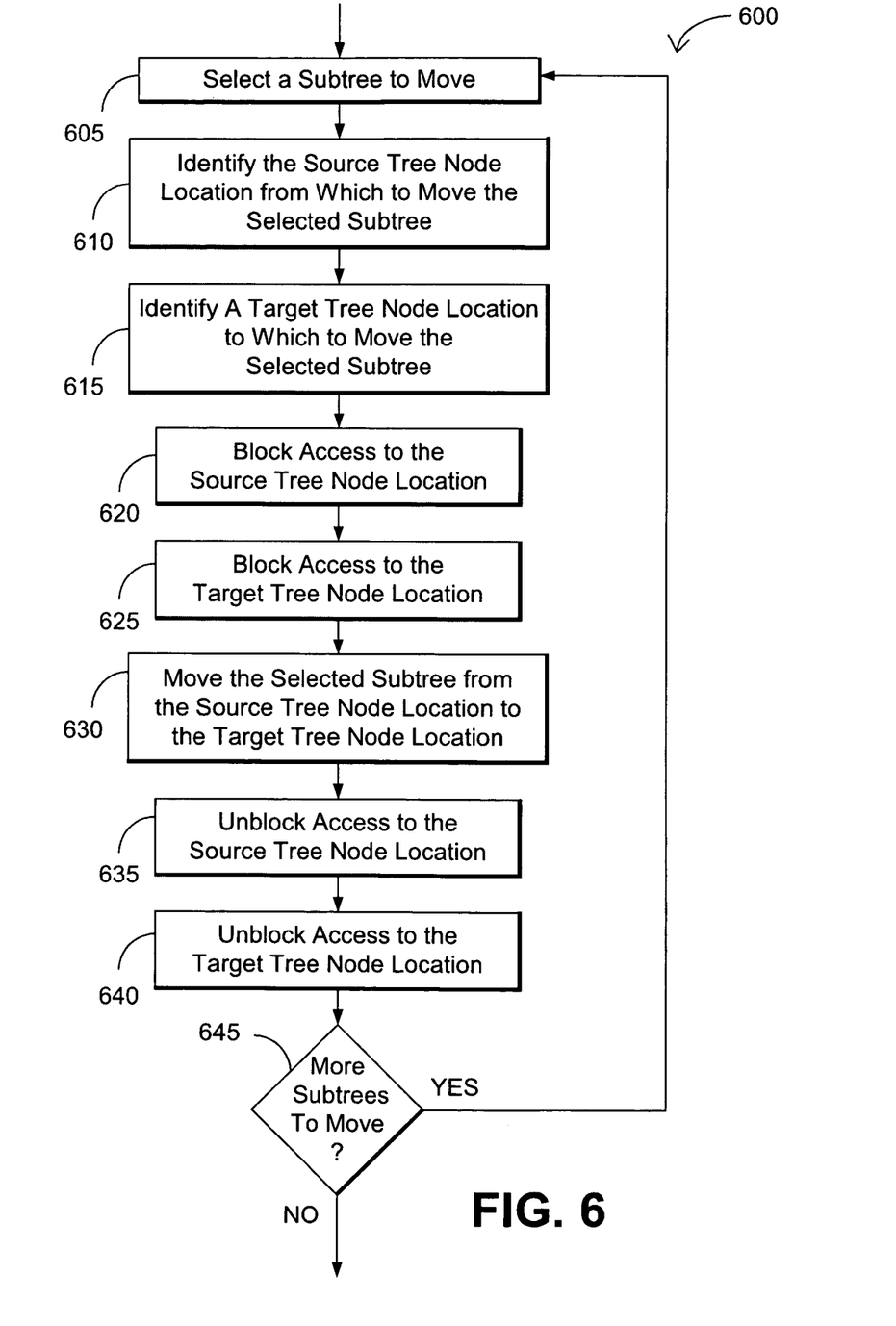
FIG. 6 is a flow chart of a method for the movement of SCPI subtrees in SCPI trees as described in various representative embodiments.

FIG. 6 is a flow chart of a method 600 for the movement of SCPI subtrees 135 in SCPI trees 125 as described in various representative embodiments. In block 605 of FIG. 6, a SCPI subtree 135 is selected for movement to another SCPI node location 250. Block 605 then transfers control to block 610.

In block 610, the source SCPI node location 250 from which the selected SCPI subtree 135 is to be moved to another SCPI node location 250 is identified. Block 610 then transfers control to block 615.

In block 615, the target SCPI node location 250 to which the selected SCPI subtree 135 is to be moved is identified. Block 615 then transfers control to block 620.

In block 620, access to the selected source SCPI node location 250 is blocked or restricted for access by other than the SCPI grammar controller 140. Block 620 then transfers control to block 625.

In block 625, access to the selected target SCPI node location 250 is blocked or restricted for access by other than the SCPI grammar controller 140. Block 625 then transfers control to block 630.

In block 630, the selected SCPI subtree 135 is moved from the source SCPI node location 250 to the target SCPI node location 250 by the SCPI grammar controller 140. Block 630 then transfers control to block 635.

In block 635, access to the source SCPI node location 250 is unblocked (access restriction is removed). Block 635 then transfers control to block 640.

In block 640, access to the target SCPI node location 250 is unblocked (access restriction is removed). Block 640 then transfers control to block 645.

In block 645, when the there are additional SCPI subtrees 135 to be moved, block 645 transfers control to block 605. Otherwise, block 645 terminates the process.

As in a large number of data processing systems, the nodes of the SCPI trees 125 may comprise pointers to other SCPI nodes 130 and pointers to SCPI commands/functions rather than the actual commands/functions themselves. The SCPI nodes 130, as well as the commands/functions, can be shared between different SCPI trees 125.

Using the above described methods 300,400,500,600, the SCPI grammar controller 140 can dynamically create and modify SCPI trees 125 at runtime. Automatically or at run time SCPI nodes 130 and SCPI subtrees 135 can be altered by addition, modification, and/or removal as applications are added, modified, and/or removed. When an application is added, it may have to add new SCPI nodes 130 such that the new functionality of the application is available for use by the clients 105. Previously it was necessary to shut down and recompile the SCPI tree. But, with the present methods the system does not have to be shut down. Changes to the SCPI grammar are performed in real time. SCPI nodes 130 being changed are temporarily blocked to prevent clients 105 and applications from accessing them while those SCPI nodes 130 are being changed.

Such changes could be initiated in a number of ways, one of which could be by a SCPI command. The command that initiates the process could be one that loads a new application or one that instructs the instrument 115 to present a different instrument mode to the user. In some instances it could be initiated by a client 105 purchasing a license to install and use a particular software program on the instrument 115 coupled with the running of an installation utility on the instrument 115. Or perhaps the instrument 115 accessed a license server and found that the instrument 115 now has the right to run a new application.

In representative embodiments, methods for the alteration of a Standard Commands for Programmable Instrumentation (SCPI) command set for instrument 115 control are disclosed herein. The group of commands controlling the instrument 115, an instrument application or an instrument function is referred to herein as the command set. Each command of the command set includes a different combination of SCPI grammatical elements; the SCPI grammatical elements are organized hierarchically in a tree 125 data structure. The tree has nodes 130 with each node 130 comprising one of the SCPI grammatical elements. A node 130 to alter is selected, and an alteration to the selected node 130 is specified. Access to the selected node 130, as well as to any descendant nodes 130 of the selected node 130 is restricted; the selected node 130 is altered in accordance with the specified alteration, wherein the alteration of the selected node 130 is performed at runtime; and the access restriction to the selected node 130 and to any descendant nodes 130 of the selected node 130 is removed, wherein the access restriction, node 130 alteration, and access removal are performed while the instrument 115 is operational. Similar statements as for nodes 130 are also applicable for subtrees 135.

Alteration of the selected node comprises when the grammatical element of the selected node is to be removed from the command set, removing the selected node and any descendant nodes of the selected node from the tree. Otherwise, when a new node comprising a new grammatical element is to be added to the command set, the new node including the new grammatical element for inclusion in the tree is prepared and the new node is added to the tree. Otherwise, the grammatical element of the selected node is appropriately changed.

In representative embodiments, at least one node other than the selected node is accessible for instrument control while at least the restriction, alteration, and removal steps are performed. In alternative other embodiments, the selected node is the tree's root node.

In another representative embodiment, a system for altering a Standard Commands for Programmable Instrumentation (SCPI) command set for instrument 115 control is disclosed. The system comprises a grammar logic module. Each command of the command set comprises a different combination of SCPI grammatical elements; the SCPI grammatical elements are organized hierarchically in a tree data structure; and the tree 125 has nodes 130 with each node 130 comprising one of the SCPI grammatical elements. When a node 130 is selected for alteration and an alteration to the selected node 130 is specified, the grammar logic module has capability of restricting access to the selected node 130 and to any descendant nodes 130 of the selected node 130, altering the selected node 130 in accordance with the specified alteration, wherein the step altering the selected node 130 is performed at runtime, and removing access restriction to the selected node 130 and to any descendant nodes 130 of the selected node 130. While access to the selected node 130 is restricted, the instrument 115 is operational. Similar statements as for nodes 130 are also applicable for subtrees 135.

As is the case, in many data-processing products, the SCPI grammar modification system 100 described herein may be implemented as a combination of hardware and software components. Moreover, the functionality needed for using such implementations may be embodied in computer-readable media, such as 3.5 inch floppy disks, conventional hard disks, DVD's, CD-ROM's, Flash ROM's, nonvolatile ROM, RAM and the like, to be used in programming an information-processing apparatus (e.g., a computer and/or instrument 115) to perform in accordance with these implementations.

The term "program storage medium" is broadly defined herein to include any kind of computer memory such as, but not limited to, floppy disks, conventional hard disks, DVD's, CD-ROM's, Flash ROM's, nonvolatile ROM, RAM, and the like.

Client 105 and developer computers, as well as instruments 115 used with this SCPI grammar modification system 100, can be capable of running one or more of any commercially available operating system such as DOS, various versions of Microsoft Windows (Windows 95, 98, Me, 2000, NT, XP, or the like), Apple's MAC OS X, UNIX, Linux, or other suitable operating system.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiment that remain within the scope of the appended claims.

What is claimed is:

1. A method for altering a Standard Commands for Programmable Instrumentation (SCPI) command set for instrument control, comprising:
   selecting a node to alter, wherein each command of the command set comprises a different combination of SCPI grammatical elements, wherein the SCPI grammatical elements are organized hierarchically in a tree data structure, and wherein the tree has nodes with each node comprising one of the SCPI grammatical elements;
   specifying an alteration to the selected node;
   restricting access to the selected node and to any descendant nodes of the selected node;
   altering the selected node in accordance with the specified alteration, wherein the step altering the selected node is performed at runtime; and
   removing access restriction to the selected node and to any descendant nodes of the selected node, wherein at least the restriction, alteration, and removal steps are performed while the instrument is operational.

2. The method as recited in claim 1, wherein the step altering the selected node comprises:
   when the grammatical element of the selected node is to be removed from the command set,
      removing the selected node and any descendant nodes of the selected node from the tree;
   otherwise, when a new node comprising a new grammatical element is to be added to the command set
      preparing the new node including the new grammatical element for inclusion in the tree and
      adding the new node to the tree; and
   otherwise,
      appropriately changing the grammatical element of the selected node.

3. The method as recited in claim 2, wherein at least one node other than the selected node is accessible for instrument control while at least the restriction, alteration, and removal steps are performed.

4. The method as recited in claim 2, wherein the selected node is the tree's root node.

5. The method as recited in claim 1, wherein alteration of the command set is automatically enabled by possession of an electronic license for change in instrument capability as specified by the license.

6. A computer readable memory device embodying a computer program of instructions executable by the computer for altering a Standard Commands for Programmable Instrumentation (SCPI) command set for instrument control, the instructions comprising:
   selecting a node to alter, wherein each command of the command set comprises a different combination of SCPI grammatical elements, wherein the SCPI grammatical elements are organized hierarchically in a tree data structure, and wherein the tree has nodes with each node comprising one of the SCPI grammatical elements;
   specifying an alteration to the selected node;
   restricting access to the selected node and to any descendant nodes of the selected node;
   altering the selected node in accordance with the specified alteration, wherein the step altering the selected node is performed at runtime; and
   removing access restriction to the selected node and to any descendant nodes of the selected node, wherein at least the restriction, alteration, and removal steps are performed while the instrument is operational.

7. The computer readable memory device as recited in claim 6, the instruction altering the selected node comprising:
   when the grammatical element of the selected node is to be removed from the command set,
      removing the selected node and any descendant nodes of the selected node from the tree;
   otherwise, when a new node comprising a new grammatical element is to be added to the command set
      preparing the new node including the new grammatical element for inclusion in the tree and adding the new node to the tree; and
   otherwise,
      appropriately changing the grammatical element of the selected node.

8. The computer readable memory device as recited in claim 7, wherein at least one node other than the selected node is accessible for instrument control while at least the restriction, alteration, and removal steps are performed.

9. The computer readable memory device as recited in claim 7, wherein the selected node is the tree's root node.

10. The computer readable memory device as recited in claim 6, wherein alteration of the command set is automatically enabled by possession of an electronic license for change in instrument capability as specified by the license.

11. A system for altering a Standard Commands for Programmable Instrumentation (SCPI) command set for instrument control, comprising:

a grammar logic module, wherein each command of the command set comprises a different combination of SCPI grammatical elements, wherein the SCPI grammatical elements are organized hierarchically in a tree data structure, wherein the tree has nodes with each node comprising one of the SCPI grammatical elements, wherein when a node is selected for alteration and an alteration to the selected node is specified, the grammar logic module has capability of restricting access to the selected node and to any descendant nodes of the selected node, altering the selected node in accordance with the specified alteration, wherein the step altering the selected node is performed at runtime, and removing access restriction to the selected node and to any descendant nodes of the selected node, and wherein while access to the selected node is restricted, the instrument is operational.

12. The system as recited in claim 11, wherein when the grammatical element of the selected node is to be removed from the command set, the grammar logic module has capability of removing the selected node and any descendant nodes of the selected node from the tree;

otherwise, when a new node comprising a new grammatical element is to be added to the command set the grammar logic module has capability of preparing the new node including the new grammatical element for inclusion in the tree and adding the new node to the tree; and otherwise, the grammar logic module has capability of appropriately changing the grammatical element of the selected node.

13. The system as recited in claim 12, wherein at least one node other than the selected node is accessible for instrument control while access to the selected node is restricted.

14. The system as recited in claim 12, wherein the selected node is the tree's root node.

15. The system as recited in claim 11, wherein alteration of the command set is automatically enabled by possession of an electronic license for change in instrument capability as specified by the license.

16. A system for altering a Standard Commands for Programmable Instrumentation (SCPI) command set for instrument control, comprising:

means for selecting a node to alter, wherein each command of the command set comprises a different combination of SCPI grammatical elements, wherein the SCPI grammatical elements are organized hierarchically in a tree data structure, and wherein the tree has nodes with each node comprising one of the SCPI grammatical elements;

means for specifying an alteration to the selected node;

means for restricting access to the selected node and to any descendant nodes of the selected node, wherein at least one node other than the selected node is accessible for instrument control and wherein the instrument is operable;

when the grammatical element of the selected node is to be removed from the command set:

means for removing the selected node and any descendant nodes of the selected node from the tree;

otherwise, when a new node comprising a new grammatical element is to be added to the command set:

means for preparing the new node including the new grammatical element for inclusion in the tree and means for adding the new node to the tree;

otherwise, means for appropriately changing the grammatical element of the selected node; and means for removing access restriction to the selected node and to any descendant nodes of the selected node, wherein at least the restriction, alteration, and removal steps are performed while the instrument is operational.

* * * * *